(No Model.)
H. W. FISHER.
JOINT FOR ELECTRIC CONDUCTORS.
No. 464,475. Patented Dec. 1, 1891.
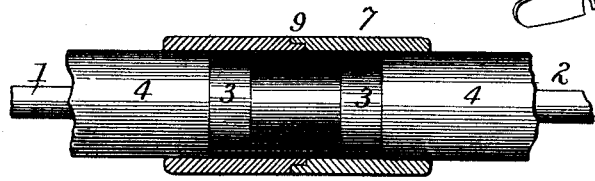
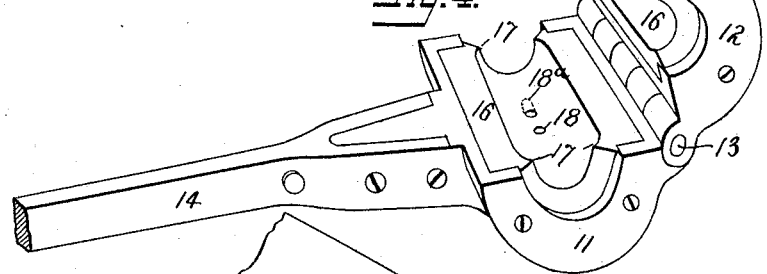
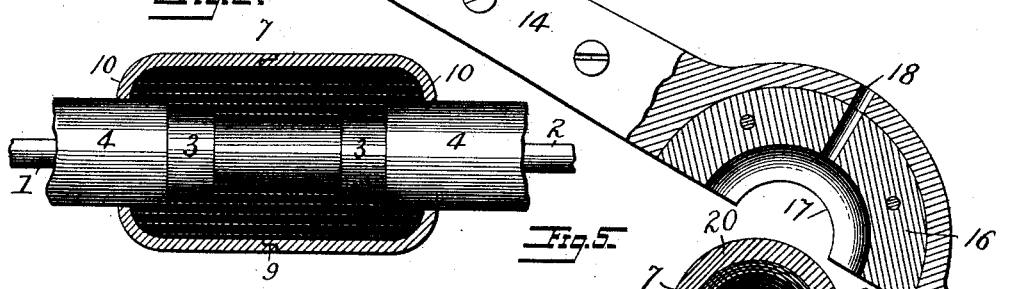
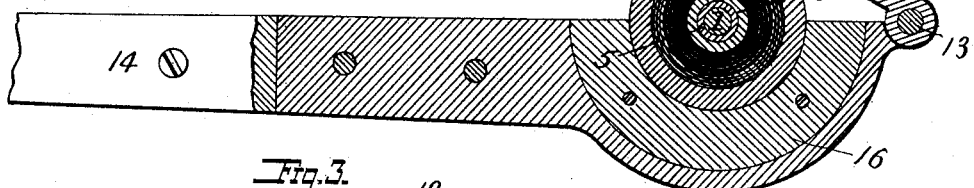
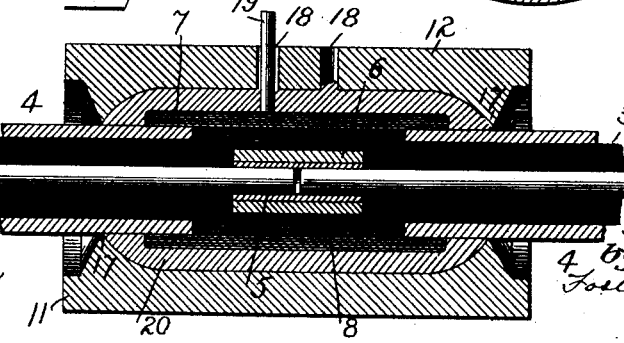
WITNESSES
H. S. McArthur
E. L. Thrasher
INVENTOR
Henry W. Fisher.
by Foster Freeman
Attorneys
THE NORRIS PETERS CO., PHOTO-LITHO., WASHINGTON, D. C.

UNITED STATES PATENT OFFICE.

HENRY W. FISHER, OF PITTSBURG, PENNSYLVANIA, ASSIGNOR TO THE STANDARD UNDERGROUND CABLE COMPANY, OF SAME PLACE.

JOINT FOR ELECTRIC CONDUCTORS.

SPECIFICATION forming part of Letters Patent No. 464,475, dated December 1, 1891.

Application filed March 7, 1891. Serial No. 384,158. (No model.)

*To all whom it may concern:*

Be it known that I, HENRY W. FISHER, a citizen of the United States, residing at Pittsburg, Allegheny county, State of Pennsylvania, have invented certain new and useful Improvements in Joints for Electric Conductors, of which the following is a specification.

My invention relates to joints for electric conductors and methods of making them, and more particularly to that class in which metal-armored conductors are united by means of a hollow cast-metal joint so arranged that a space is formed in the interior of the joint for the reception of insulating material; and my invention consists in such a joint made substantially as described.

Referring to the accompanying drawings, Figure 1 is a side view showing the ends of two conductors joined, with the sleeve or tube surrounding them in section. Fig. 2 is a similar view showing a modified form of the sleeve. Fig. 3 is a sectional view showing the joint-mold with the parts forming the joint in position. Fig. 4 is a perspective view of the mold, showing the parts distanced; and Fig. 5 is a transverse section through the mold and joint.

In the use of electric conductors, especially those which are laid in conduits or under the earth, it is a great desideratum to provide as nearly perfect an insulation as is possible, not only on account of saving in the loss of electricity, but for the safety of the parts as well. In the use of such cables it is common to provide a conductor with some highly-insulating material and to coat this with a metallic covering, casing, or armor to protect it from abrasion or destruction from any cause, and in this way cables having a high degree of insulation have been formed. These cables, however, have to be joined for various purposes, as at the junction-boxes, man-holes, or other places, and it has been found necessary to take great precaution in forming these joints in order to maintain the high degree of insulation, and many attempts have been made to provide means for accomplishing this result in a simple, cheap, and effective manner; and it is the main object of my invention to furnish such means whereby a perfectly-insulated joint can be made by an ordinary workman without the necessity of employing skilled plumbers or other artisans to make the joint, and in doing this I make use of a joint-mold, which, in connection with a sleeve, tube, or core, enables me to make a hollow cast-metal joint uniting the metal-armored conductors, which hollow joint may be filled with insulating material.

I have shown my invention applied in uniting the adjacent ends of two conductors or cables, each consisting of one or more wires 1 2, covered with insulating material 3 of any suitable character, over which is a metallic armor or covering 4. In uniting the ends of the conductors the insulating-covering 3 is removed therefrom for a sufficient distance and the armor is removed from the insulation near the ends, so as to leave the insulating material exposed, as is usual in uniting such cables or conductors. The ends of the adjacent wires are then united in any desired way, depending upon their size and construction. Thus they may be twisted together and soldered, or a copper sleeve 5, Fig. 3, may be fitted over their ends and secured in any proper manner to furnish good conductivity and offer little or no resistance between the points of junction of the two cables, and this joint may then be covered with some insulating material 6 to a thickness preferably a little less than that of the insulation of the cable conductor.

In order to make the hollow cast joint to unite the adjacent ends of the cable, I provide a tube or sleeve 7, preferably of some insulating material—such as papier-maché or a vitrified substance—and this is fitted so as to extend over the armor of the adjacent ends of the cables a sufficient distance to rest thereon. This tube may be variously formed to suit the requirements of any particular case. Thus in Fig. 3 I have shown it as being a single tube having an interior diameter equal to the exterior diameter of the armor and forming a hollow space 8 between the exposed portions of the insulating material of the adjacent cables. In Fig. 2 this tube or sleeve is shown in two parts, each of which fits one of the armored ends of the cables, and the two portions are united by a joint 9 at or near their centers. In Fig. 2 the sleeve or tube is shown having a diameter considerably larger than the cables, with its ends 10 closed, being turned or dressed down or tapered, so that they fit snugly upon the armor of the adjacent conductors, forming a larger recess or space 8 around the ends of the cables. In actual practice it will be understood that this sleeve, either in one or two portions, is slipped over the end or ends of the conductor or conductors before the line-wires are joined, and when they are properly joined it is moved into the position shown in the drawings.

In order to form the metal joint around the sleeve, I preferably make use of a joint-mold such as is illustrated in Figs. 4 and 5, although it is evident that other means may be adopted for carrying out my invention. This mold consists of two portions 11 12, hinged together, as at 13, and provided with handles 14, which may have a locking-latch or connector, as 15. These portions 11 are made hollow for the reception of the bowls or molds 16, by means of which the melted metal is molded around the ends of the cable. These molds being removable, may be made in various sizes to fit various styles of cables and to make different-shaped joints, the exterior of the bowls being formed to fit the hollow portions 11, while the interior is fashioned to form the joint of the shape desired, the ends or edges 17 preferably surrounding the metal armor of the cables and fitting closely thereon when the parts are closed and fastened together.

For convenience of illustration I have shown a joint-mold for uniting the adjacent ends of two straight conductors; but it is evident that the same principles would apply in making any other form of joint or splice, the parts being correspondingly shaped to perform the desired ends.

In carrying out the invention from the above it will be seen that the ends of the cables are united in any usual way, the insulation and armor adjacent to the ends being removed to a sufficient distance and the sleeves or a portion thereof being slipped over the armor before the ends are united and then moved into position. (Clearly illustrated in Fig. 3.) I would say here that I preferably dip the paper or other insulating-tube into a bath of hot solder before it is applied to the cable, in order to drive off any gas or moisture which may be contained therein, and after it is slipped into position over the joint I find it advantageous to apply some hot solder over the tube before it is put into the mold; but these are refinements, and need not be used, except where every precaution is necessary to be taken to produce high insulation. The cable with the tube applied is then placed in one of the bowls 16 of the mold, as shown in Fig. 3, when the mold is closed the edges preferably fitting the armor 4 of the adjacent ends of the cable, and the parts are ready to receive the molten material to form the cast-metal joint.

I have found in practice that in pouring the material in there is more or less evolution of gas, which may result in blow-holes or other imperfections in the joints, and in order to obviate this, as well as to leave an opening in the metal of the joint around the insulating-tube to permit the application of insulating compound to the interior of the sleeve, I provide the mold with two or more pour-holes 18, in one of which I place a metal rod or similar device 19, preferably somewhat smaller in diameter than the hole itself, and this rod rests upon the insulating sleeve or tube 7. When this is done, the molten metal is poured into the mold through one of the openings 18 and forms a complete cast-metal joint or union 20, covering the insulating-tube 7 and uniting with the armor 4 of each end of the cable; or I may have but one pour-hole of oval form, as indicated by dotted lines 18ª, sufficiently large to receive the rod at one end and to admit the molten solder at the other. When this joint is set, I remove the rod 19 and with a knife or other proper instrument puncture a hole through the insulating-tube 7, and then pour in through this opening a fluid insulating compound, which completely surrounds the ends of the conductor and fills the space in the interior of the insulating-tube, when the joint may be removed from the mold and the hole through the metal joint closed by a lead cap of melted material, and the joint is complete. It will be understood that, if desired, the metal joint may be used without filling the interior of the insulated tube with the insulating material, in which case of course the rod 19 is not used.

From the above description the general principles of my invention will be clearly understood, and it is evident that the details of construction and arrangement may be varied by those skilled in the art to apply my invention to different kinds of joints and splices.

What I claim is—

1. An electric cable consisting of two or more portions of armored conductors having their ends united by a hollow cast-metal joint forming an integral part with the adjacent sections of armor, substantially as described.

2. An electric cable consisting of two or more portions having their ends united by an insulating-sleeve, and a hollow cast-metal joint, substantially as described.

3. An electric cable consisting of two or more portions having their adjacent ends united by an insulating-sleeve made in two sections overlapping each other, and a hollow cast-metal joint surrounding the sleeve, substantially as described.

4. An insulated electric cable consisting of two or more portions having their adjacent ends united by a sleeve, with insulating material filling the space within the sleeve and a hollow cast-metal joint surrounding the sleeve, substantially as described.

5. The combination, with the adjacent ends of two or more metal-armored conductors, of a hollow sleeve or tube surrounding the ends, and a hollow cast-metal joint embracing the sleeve and forming an integral part with the adjacent sections of armor, substantially as described.

6. The method, substantially as hereinbefore set forth, of uniting the adjacent ends of metal-armored conductors, which consists in casting around the ends a hollow metal joint, the metal of the joint fusing and uniting with the metal armor of the conductors, forming an integral part with the adjacent sections.

7. The method, substantially as hereinbefore set forth, of uniting the adjacent ends of metal-armored conductors, which consists in providing the ends of the conductors with a hollow core and then casting around said core a metal joint, the metal of the joint fusing and uniting with the metal armor of the conductors, forming an integral part with the adjacent sections.

8. The method, substantially as hereinbefore set forth, which consists in uniting the adjacent ends of metal-armored conductors, which consists in providing the ends of the conductors with a hollow core and then casting around said core a metal joint, the joint forming an integral part with the adjacent sections of armor, and then filling the interior of the hollow joints with insulating material.

In testimony whereof I have signed my name to this specification in the presence of two subscribing witnesses.

HENRY W. FISHER.

Witnesses:
C. C. WOLFE,
W. D. UPTEGRAFF.